United States Patent
Heikkila et al.

(10) Patent No.: US 11,379,096 B2
(45) Date of Patent: Jul. 5, 2022

(54) DYNAMIC WORKING AREA

(71) Applicant: SANDVIK MINING AND CONSTRUCTION OY, Tampere (FI)

(72) Inventors: Tommi Heikkila, Tampere (FI); Juha Lassila, Tampere (FI); Henri Suvanen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 250 days.

(21) Appl. No.: 13/911,182

(22) Filed: Jun. 6, 2013

(65) Prior Publication Data

US 2013/0332875 A1 Dec. 12, 2013

(30) Foreign Application Priority Data

Jun. 7, 2012 (EP) ..................................... 12171136

(51) Int. Cl.
  *G06F 3/0484* (2022.01)
  *E21B 7/02* (2006.01)
  *E21D 9/00* (2006.01)

(52) U.S. Cl.
  CPC ............ *G06F 3/0484* (2013.01); *E21B 7/022* (2013.01); *E21B 7/025* (2013.01); *E21D 9/006* (2013.01)

(58) Field of Classification Search
  CPC ....................................... G06F 3/14; G06F 3/17
  USPC ................... 715/771; 703/2; 175/27; 606/80; 299/67; 701/50
  See application file for complete search history.

(56) References Cited

U.S. PATENT DOCUMENTS

| 2,983,496 A | * | 5/1961 | Louisa | 299/67 |
| 2008/0125942 A1 | * | 5/2008 | Tucker et al. | 701/50 |
| 2011/0077924 A1 | * | 3/2011 | Ertas et al. | 703/2 |
| 2011/0254694 A1 | | 10/2011 | Lanzl et al. | |
| 2013/0146358 A1 | * | 6/2013 | DiSantis | 175/27 |
| 2014/0148808 A1 | * | 5/2014 | Inkpen et al. | 606/80 |

FOREIGN PATENT DOCUMENTS

| CN | 101663463 A | 3/2010 |
| JP | 7089697 A | 4/1995 |
| WO | 2008125735 A1 | 10/2008 |

(Continued)

OTHER PUBLICATIONS

Dongsheng, Liu et al. "TYBS25 Drilling Boom Motion Analysis and Calculation of the Drillable Scope", Rock Drilling Machings and Pneumatic Tools, No. 4 1993, pp. 10-18.

(Continued)

*Primary Examiner* — Ruay Ho
(74) *Attorney, Agent, or Firm* — Corinne R. Gorski

(57) ABSTRACT

A method for defining a working area of a rock drilling rig including the steps of determining at least one current input parameter, determining a working area that defines a reach of the drilling unit in a control unit on the basis of the at least one current input parameter and at least one fixed reach parameter, displaying a graphical representation of the working area on a display, and re-determining the working area and updating the graphical representation of the working area dynamically in response to a change in the input parameters. The current input parameter may be, for example, an orientation of the rock drilling rig or a hole parameter.

11 Claims, 4 Drawing Sheets

(56) References Cited

FOREIGN PATENT DOCUMENTS

| WO | 2009150294 A1 | 9/2011 |
|----|---------------|--------|
| WO | 2011104440 A1 | 9/2011 |

OTHER PUBLICATIONS

Imin, Zhu et al. "Calculation of Drilling Region of ZZ2-8/100 Type Drilling and Loading Machine", Coal Mine Machinery, vol. 33 No. 3, pp. 37-38.

* cited by examiner

DYNAMIC WORKING AREA

RELATED APPLICATION DATA

The present application claims priority under 35 U.S.C. § 119 to EP Patent Application No. 12171136 filed on Jun. 7, 2012, which the entirety thereof is incorporated herein by reference.

SUMMARY

The disclosed embodiments, that should be considered as non-limiting examples only, relate to a rock drilling rig, and more particularly to presenting a working area of a rock drilling rig on a display.

At present, it is usual to use pre-determined hole parameters that may be based on drilling plans, for example. When tramming a drilling rig, the position of the drilling rig may be displayed in relation to one or more planned holes of a drilling plan on a display of a graphical user interface.

User interfaces displaying some kind of working area of the rock drilling rig, i.e. an area presenting the drilling range of the rock drilling rig from its position, are also known. However, when presenting the drilling range in this way, the working area is typically defined as a fixed area shown around the rock drilling rig, i.e. the working area of a fixed shape is only updated with respect to the location of the rock drilling rig. This kind of fixed working area is, however, always only an approximation and does not reflect the true working area. Thus, the operator cannot trust the information when trying to optimise the drilling, for example.

The following presents a simplified and non-limiting summary of the invention in order to provide a basic understanding of some aspects of the invention. Different aspects of the invention comprise a method, an assembly, a user interface, and a rock drilling rig as defined in the independent claims. Further embodiments of the invention are disclosed in the dependent claims.

According to an aspect, a method for defining a working area of a rock drilling rig comprises determining at least one of the following current input parameters: an orientation of the rock drilling rig and a hole parameter; determining a working area that defines a reach of the drilling unit in the control unit on the basis of the at least one current input parameter and at least one fixed reach parameter; displaying a graphical representation of the working area on the display; and re-determining the working area and updating the graphical representation of the working area dynamically in response to a change in the input parameters, wherein the working area is displayed by indicating one or more holes that can be drilled from a current position of the rock drilling rig Such a rock drilling rig preferably comprises: a movable carrier; at least one boom pivoted to the carrier; a drilling unit arranged on the boom; as well as at least one control unit and at least one display device connected to it.

According to another aspect, an arrangement for a rock drilling rig comprises means for determining at least one of the following current input parameters: an orientation of the rock drilling rig and a hole parameter; at least one control unit configured to determine a working area that defines a reach of the drilling unit in the control unit on the basis of the at least one current input parameter and at least one fixed reach parameter, and to re-determine the working area and to update the graphical representation of the working area dynamically in response to a change in the input parameters; and at least one display configured to display the working area of the rock drilling rig as a graphical representation by indicating one or more holes that can be drilled from a current position of the rock drilling rig.

According to a third aspect, a user interface of a rock drilling rig comprises at least one display, wherein the display is configured to display a working area of a rock drilling rig as a graphical representation determined on the basis of at least one of the following current input parameters: an orientation of the rock drilling rig and a hole parameter, wherein the working area is displayed by indicating one or more holes that can be drilled from a current position of the rock drilling rig.

According to a first embodiment, a kinematic model of a boom is stored as a fixed reach parameter, which kinematic model comprises at least the dimensions, joints and movement ranges of the joints of the boom that affects its reach, and the kinematic model information is used as a basis for determining the working area.

According to a second embodiment, means for determining the orientation of the rock drilling rig comprise at least one detecting device.

According to a third embodiment, a movement range of at least one joint of the boom is determined and the movement range is used as a fixed reach parameter for determining the working area.

According to a fourth embodiment, the drilling unit comprises at least one rock drilling machine and a tool; and the arrangement further comprises means for determining the orientation of the tool and using it as a current input parameter for determining the working area; and the display is configured to display the graphical representation of the working area by displaying the position of the tool in relation to the working area.

According to a fifth embodiment, the position of the rock drilling rig is determined and used as a further input parameter for determining the working area.

According to a sixth embodiment, the at least one hole parameter comprises at least one of the following: a hole inclination, a hole direction and a hole position.

According to a seventh embodiment, at least one of the following is used for determining the orientation of the rock drilling rig: an inclination sensor, an angle sensor and/or a linear movement sensor.

According to an eighth embodiment, at least one of the control unit and the display is located remotely from the rock drilling rig.

According to a ninth embodiment, a rock drilling rig comprises an arrangement described above.

An advantage of the method and arrangement of the invention is that the use of the actual current input parameters gives a considerably more accurate definition of a working area to be displayed to an operator than that achieved by using a fixed working area approximation based on predefined parameters presented around a rock drilling rig. Thus, the operator can more accurately evaluate, whether a hole can be drilled without moving the drilling rig or not, for example.

BRIEF DESCRIPTION OF THE DRAWINGS

In the following the invention will be described in greater detail by means of preferred embodiments with reference to the attached drawings, in which.

DETAILED DESCRIPTION

It will be obvious to a person skilled in the art that, as the technology advances, the inventive concept can be implemented in various ways. The present embodiments are not limited to the examples described above but may vary within the scope of the claims.

Figure 1A:
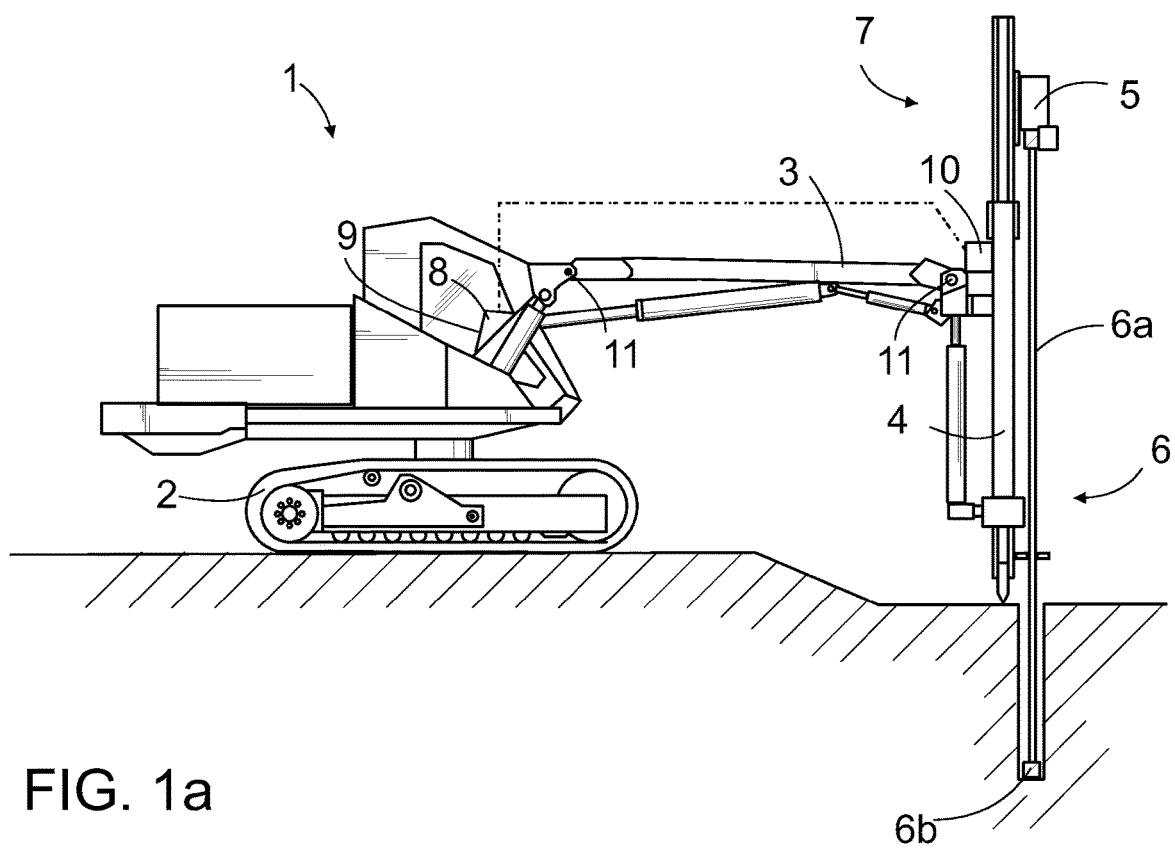
FIGS. 1a and 1b illustrate schematically different rock drilling rigs.

The rock drilling rig 1 shown in FIG. 1a comprises a mobile carrier 2 having one or more drilling booms 3 arranged thereto. A drilling unit 7 comprises a feed beam 4, a drilling machine 5 and a feed device arranged at one end of the boom 3. The drilling machine 5 is arranged movably on the feed beam 4 and can thus move along the feed beam 4 during operation. Drilling equipment 6 is arranged to the rock drilling machine 5. The drilling equipment 6 comprises one or more drill rods 6a and a tool 6b, e.g. a drilling bit, that are connected to each other in a manner known per se. A rock drilling rig 1 may also comprise one or several joints 11 joining, for example, the boom 3 to the movable carrier 2, the feed beam 4 to the boom 3 or sections of the boom 3, such as a first boom section 3a and a second boom section 3b in FIG. 1b, to one another.

Rock drilling rigs of this type and their operation as well as the structural parts including those mentioned above are generally known and, therefore, it is not necessary to explain them in more detail.

The rock drilling rig 1 may further comprise at least one control unit 8, at least one display 9 and at least one detecting device 10. These are described in more detail in connection with FIG. 2, for example. In different embodiments, the control unit 8 and the display 9 may be formed at least partly as physical part(s) of the rock drilling rig 1 or one or both of them may be located remotely from the rock drilling rig 1. The rock drilling rig 1 may also be remotely controlled.

Figure 1B:
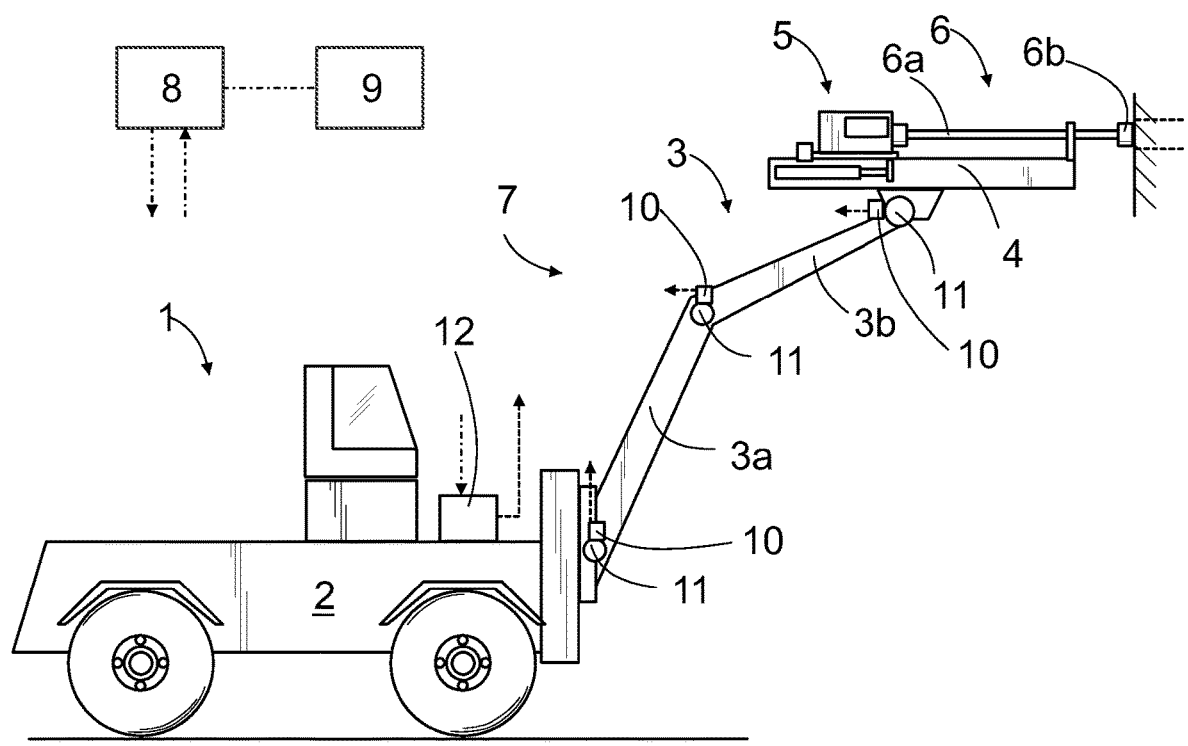

FIG. 1b illustrates schematically another type of rock drilling rig to which the described working area definition may be applied. Same reference numbers are used for structural parts with similar functions as those explained in connection with FIG. 1a. It is clear to a person skilled in the art that these are examples only and that the working area definition described in the claims is applicable to many other types of rock drilling rigs as well.

Figure 2:
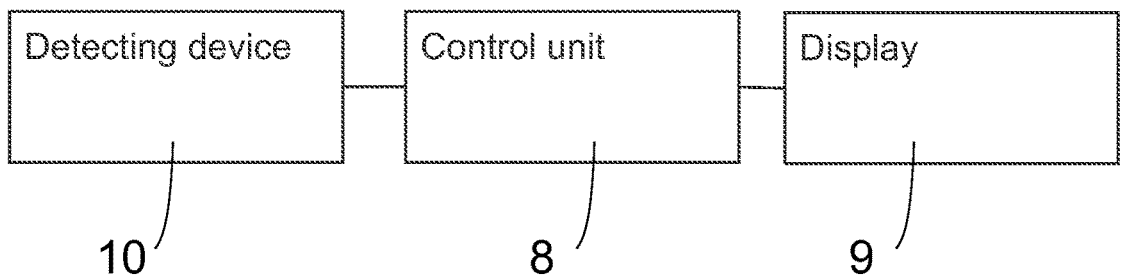
FIG. 2 illustrates schematically an arrangement for defining a working area of a rock drilling rig.

FIG. 2 schematically illustrates an arrangement for defining a working area of a rock drilling rig 1. Such a rock drilling rig may comprise, as explained above, a movable carrier 2; at least one boom 3 movable in relation to the carrier 2; a drilling unit 7 comprising a feed beam 4, a drilling machine 5 and a feed device arranged on the boom 3; as well as at least one control unit 8 and at least one display 9 device connected to it. FIGS. 1a and 1b described above show schematically some examples of such a rock drilling rig, although the control unit and the display device are not shown in the figures. It will be appreciated that in an alternative embodiment the arrangement of FIG. 2 is implemented outside the drilling rig, e.g. in a remote control device or system.

The arrangement may comprise at least one detecting device 10, at least one control unit 8 and at least one display 9. The at least one control unit 8 may comprise at least one processor and at least one memory comprising computer program code, the memory and the computer program code being configured to at least determine a working area describing the reach of the drilling unit 3 based on at least one current input parameter and at least one fixed reach parameter and to re-determine the working area dynamically in response to a change in the input parameters, when the computer program code is executed in the at least one processor. More particularly, the reach of the drilling unit 3 describes the reach of drilling equipment attached to the drilling unit and, thus, the boundaries of the movement range of the tool 6b. In different embodiments, the memory and the computer program code may further be configured to execute various method steps or functions disclosed in this description, or a combination thereof.

The current input parameters are dynamically variable parameters that may change during operation and that may affect the size, shape and/or position of the working area. In some embodiments, the current input parameters may be the output of the at least one detecting device 10 or determined on the basis thereof. However, some input parameters may be received from other information sources, such as information collected or stored in the control unit 8, and these parameters may be used in addition to input parameters from detecting devices.

Current input parameters may comprise an orientation of the rock drilling rig 1, which orientation may, in some embodiments, comprise a tilt and/or a direction, for instance the direction with respect to the rock drilling plan, of the rock drilling rig 1. The current input may comprise at least one currently applied hole parameter. However, it will be appreciated that the current input parameters may comprise also other variable information needed for determining a working area. The input parameters may comprise for instance a position of a point where a boom 3 is attached to the carrier 2, an orientation of the tool, an oscillation angle of an upper part of the rock drilling rig with respect to the carrier 2, the position of the rock drilling rig, or any other parameter affecting the current reach or the movement boundaries of the tool 6b, or any combination thereof.

Fixed reach parameters may comprise possible joint angles, i.e. the movement ranges, of at least one joint of the boom, dimensions and/or other characteristics of at least one boom section 3a, 3b, movement ranges of possible boom sections 3a, 3b in relation to one another, a position of a point where a boom is attached to the carrier 2 with respect to a point used in a rock drilling rig positioning system, a kinematic model of a boom that may be stored in the memory of the and determined using for instance the joint and boom characteristics and/or other fixed features of the rock drilling rig, or any combination thereof, affecting the size, shape and/or position of the working area and the movement boundaries of the tool. The kinematic model is described in more detail later in this description.

In this description, an orientation of an object may comprise information about the direction and/or the tilt of the object in the lengthwise and/or sideward direction of the object. Hole parameters may comprise for instance a hole inclination, a hole direction, a hole position or any combination thereof.

The detecting device(s) 10 may comprise means for determining an orientation of a rock drilling rig and/or means for detecting other relevant parameters, such as the other input parameters listed above. The detecting device(s) 10 may thus comprise one or more sensors known per se, such as inclination sensors, angle sensors and/or linear movement sensors.

The display may be configured to present the working area of the rock drilling rig as a graphical representation.

Some examples of such graphical representations are described in connection with FIGS. 4a to 4d.

Figure 3:
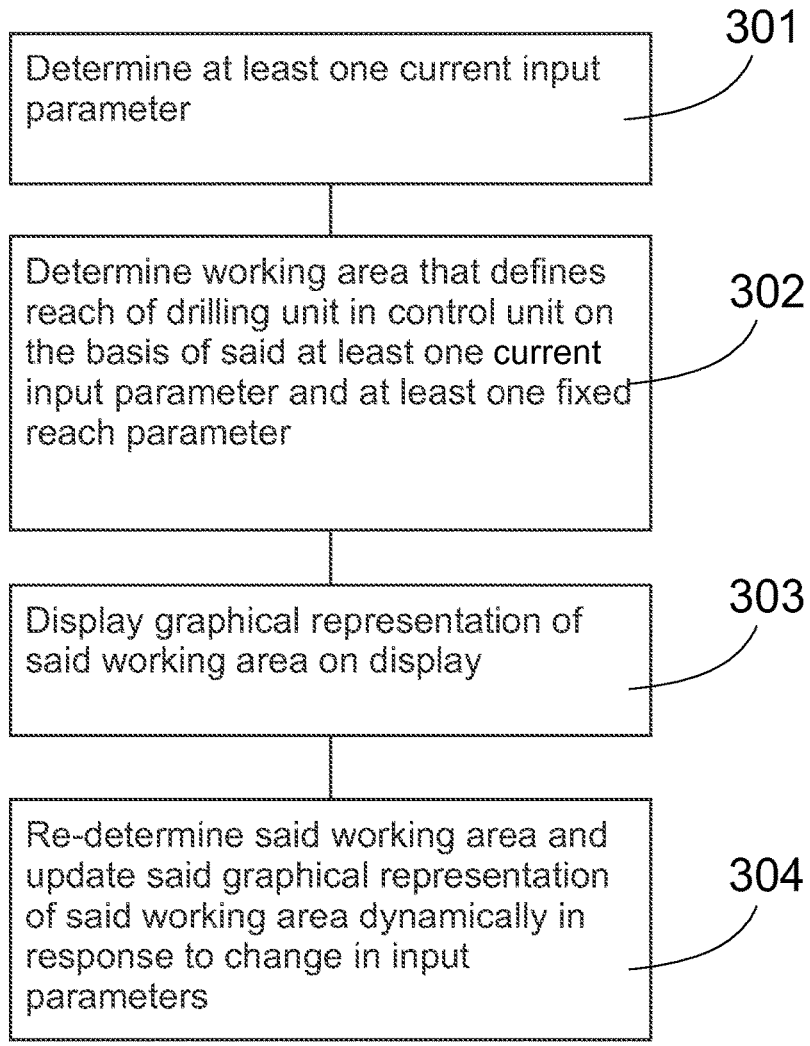
FIG. 3 describes schematically a method for defining a working area of a rock drilling rig.

FIG. 3 describes schematically a method for defining a working area of a rock drilling rig. The method comprises at least the steps of determining 301 at least one current input parameter; determining 302 a working area that defines a reach of the drilling unit in the control unit on the basis of at least one current input parameter and at least one fixed reach parameter; displaying 303 a graphical representation of the working area on the display; and re-determining 304 the working area and updating the graphical representation of the working area dynamically in response to a change in the current input parameters.

In different embodiments, the current input parameters may comprise, but are not limited to, an orientation of the rock drilling rig, a position of a point of the feed beam, an orientation of a point of the feed beam, an orientation of the tool, a position of the rock drilling rig, or any combination thereof.

The at least one fixed reach parameter may comprise, but is not limited to, movement ranges of the joints of the boom, dimensions and/or other characteristics of at least one boom section 3a, 3b, movement ranges of possible boom sections 3a, 3b in relation to one another, a position of a point where a boom is attached to the carrier 2 with respect to a point used in a rock drilling rig positioning system, a kinematic model of a boom that may be determined using for instance the joint and boom characteristics and/or other fixed features of the rock drilling rig, or any combination thereof, affecting the size and shape of the working area and the movement boundaries of the tool.

Similarly, the method may then comprise the step or steps of determining one or several of the input parameters and/or fixed reach parameters. In an embodiment, the kinematic model of a boom may comprise at least the dimensions, joints and possible joint angles, i.e. the movement range of the joint(s), of the boom and its sections affecting the reach of the boom and the boundaries of the movement range of the tool 6b. The upper part of the rock drilling rig 1 may also be oscillatable with respect to the carrier 2 for instance about a transverse axel of the carrier 2, which may also affect the reach of the boom 3 and thus also boundaries of the movement range of the tool 6b.

In different embodiments, the method described in connection with FIG. 3 may comprise using tilt sensor information for determining the orientation of the rock drilling rig.

In different embodiments, the graphical representation of the working area may comprise representing the position of the tool in relation to the working area. An example of such a graphical representation is described in connection with FIG. 4d.

In further embodiments, the method may also comprise retrieving from the memory the inclination settings, direction and/or depth and/or other hole parameters of at least one hole to be drilled. In some other embodiments, similar information may be entered manually by an operator using a user interface configured for this purpose. The graphical representation of the working area may comprise a representation of whether the hole can be drilled from the current position without moving the carrier or not. The hole parameters may be a direction and an inclination of a single hole, for example, or they may be based on a predetermined drilling plan. In other embodiments, holes and hole parameters may be determined on site at the time of drilling, there may not be any predefined parameters and/or the location of the hole may be unknown. In some embodiments, the hole parameters may not be known at all, but the user interface may display the working area for holes of certain type, i.e. holes with certain parameters, vertical holes, for example, or holes with 12 degrees inclination.

In some further embodiments, the method may further comprise navigating the rock drilling rig to a position and orientation where multiple holes are drillable. Examples of such graphical representations are described in connection with FIGS. 4b and 4c.

The working area may also be determined on the basis of other input parameters than the orientation of the rock drilling rig 1. For example, the input parameters used as a basis for determining the working area may comprise hole-related parameters, such as the inclination settings, the direction and the depth of at least one hole planned to be drilled and the working area may be displayed on the basis of this information. In other embodiments, the input parameters may comprise any parameter mentioned above or any combination thereof. This determination without the use of the orientation of the rock drilling rig may provide an adequately accurate working area determination when working on a substantially flat ground, for example.

In some embodiments, a satellite positioning system (GNSS), such as Galileo, GPS or Glonass coordinate system, may be used for determining the position and orientation of the rock drilling rig.

In an embodiment, a working area 12 may be determined on the basis of the hole parameters of at least one hole to be drilled. Joint angle(s) of at least one joint 11 of for instance the drilling boom 3 needed to drill the hole from a current location of the rock drilling rig 1 can be determined on the basis of the hole parameters. Then, the needed joint angles can be compared with possible movement range(s) of the at least one joint 11. If the needed joint angle(s) are outside the movement range(s) of respective joint(s), the hole cannot be reached and/or drilled from the current orientation and/or position of the rock drilling rig 1, i.e. they are outside the working area. This type of method based on inverse kinematics is just one example of a way of determining the working area.

Figure 4A:
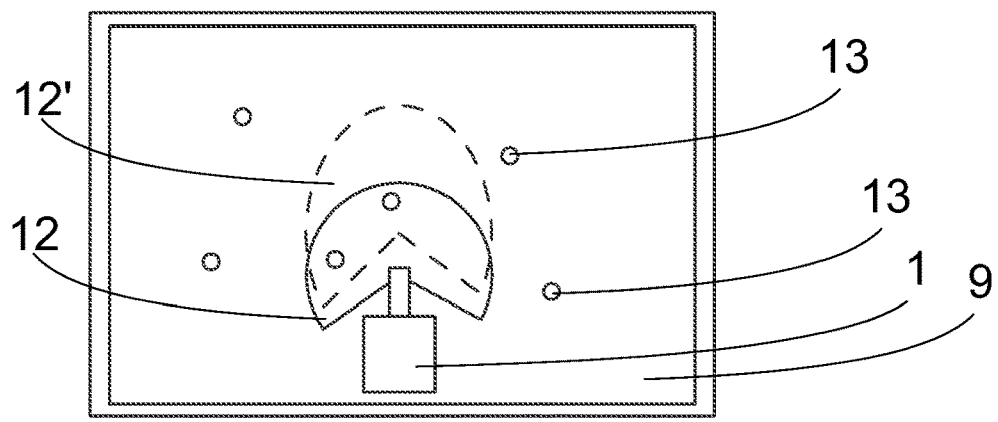
FIGS. 4a to 4d illustrate schematically different graphical representations of a working area.

FIG. 4a illustrates schematically a graphical representation of a working area on a display. In this embodiment, the working area 12 determined as explained above is shown on the display 9 in relation to the rock drilling rig 1. Additionally, some holes 13 to be drilled, only some of which are numbered in this and following figures for the sake of clarity, are also displayed. It is clear for a skilled person that the working area can also be illustrated in a number of other corresponding ways, such as with different colours, using a different shading or screening, etc. Another working area 12' represented by a dash line in FIG. 4a illustrates a possible change in the position, size and shape of the working area that has been re-determined in response to a change in at least one current input parameter, e.g. a change in the tilt of the rock drilling rig 1. In some embodiments, the working area may be divided into several subareas, e.g. on the basis of determining of which area can be reached with each boom in a rock drilling rig comprising multiple booms, etc. Additionally, in some embodiments, areas where drilling is not allowed may be excluded from the displayed working area or may be displayed separately or simultaneously in the same user interface.

Figure 4B:
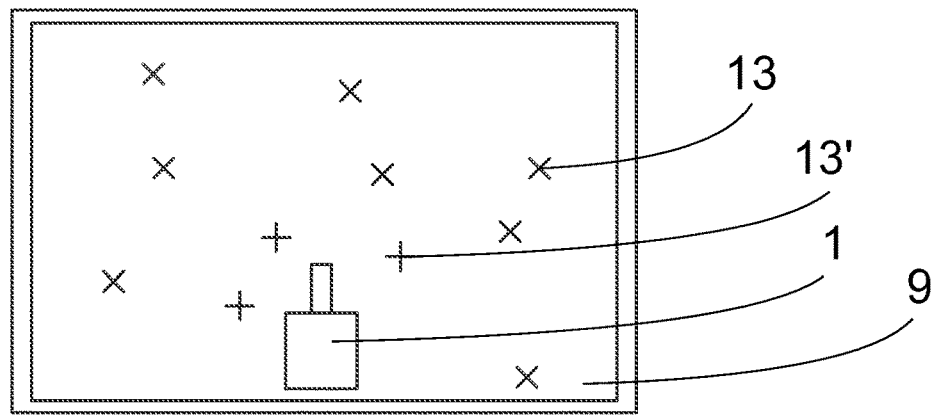

FIG. 4b illustrates schematically a graphical representation of a working area of another embodiment. In this embodiment, the working area determined as explained above is illustrated by using a different symbol, like symbol + in FIG. 4b, to indicate the holes 13', only one of which is numbered in the figure for the sake of clarity, that can be drilled from a current position of the rock drilling rig 1, i.e. without moving the rock drilling rig. In FIG. 4b, a symbol x is used to indicate the holes 13 that cannot be drilled from the current position of the rock drilling rig 1. It is clear to a skilled person that the presentation of the holes 13, 13' drillable or not drillable from the current position of the rock drilling rig can be illustrated in a number of corresponding ways as well, such as using different colours, lines of different type or width, etc.

Figure 4C:
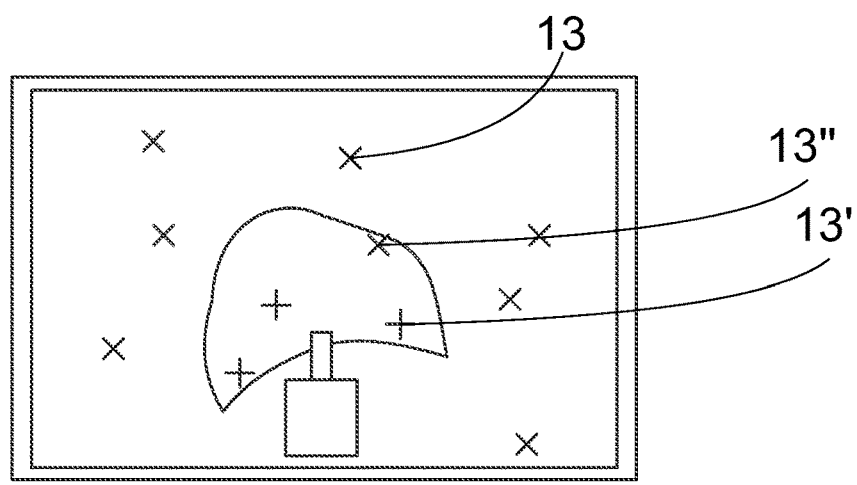

FIG. 4c illustrates schematically a graphical representation of a working area of yet another embodiment. In this embodiment, the working area determined as explained above is illustrated in a manner combining the visual working area 12 of FIG. 4a with the different visual presentation of the holes 13, 13', 13" drillable or not drillable from the current position of the rock drilling rig 1. This may often be a more informative way to represent the working area 12 compared to that of FIG. 4a, as there might be holes 13" which cannot be drilled from a current position because of for instance their inclination settings or other parameters or characteristics even though they would fall inside the working area 12 determined generally for typical hole types, for example. Similarly, in some cases, some holes falling outside the working area 12 may be possible to drill without moving the rock drilling rig 1, if they have suitable characteristics.

Figure 4D:
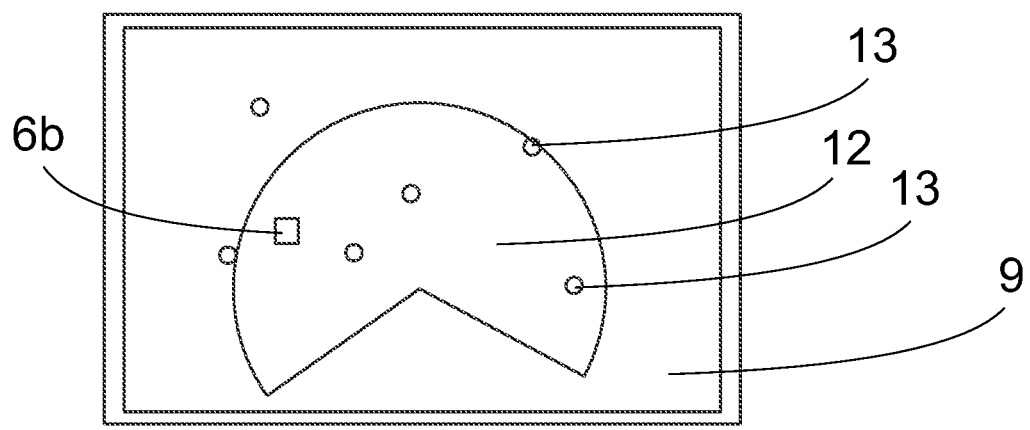

FIG. 4d illustrates schematically a graphical representation of a working area of yet another embodiment. This embodiment is similar to that of FIG. 4a, but the current position of the tool 6b in relation to the working area 12 determined as explained above is also displayed. On the other hand, the rock drilling rig 1 is not shown on the display. In fact, displaying of the rock drilling rig 1 is also not necessary in the embodiments explained above if it is obvious for the operator, where the rock drilling rig 1 is located with respect to the area shown on the display, for example in the bottom middle of the display. In some embodiments, the rock drilling rig 1 and the working area 12 may be illustrated on a larger map, for instance a general drilling plan, in which case it may be necessary to display the rock drilling rig 1 on the display as well for the sake of clarity.

In an embodiment, a control system of the drilling rig may indicate, on the basis of the determined working area and at least one hole planned to be drilled, at least one of the following to an operator: a need to move the rock drilling rig 1, a need to change the tilt of the rock drilling rig and a need to move a boom to drill the closest hole or the hole selected to be drilled. The control system may give the operator instructions regarding for instance the direction to which a boom should be moved to reach a certain hole and/or current input parameters to be changed and/or other actions to be taken to reach the hole.

The method, arrangement and user interface described above may be used in a manually operated, semi-automatic or automatic rock drilling rig 1. In some embodiments, the control system may guide the operator by for instance calculating a needed angle of each joint to reach a hole to be drilled and instruct the operator. In some further embodiments the control system may position the drilling unit 7 at the starting point of a hole to be drilled automatically after the carrier 2 and/or the drilling unit 7 has been guided towards a selected hole automatically or manually by the operator.

What is claimed is:

1. A method for defining a working area of a rock drilling rig, the method comprising the steps of:
    providing a rock drilling rig including a movable carrier, at least one boom pivotally disposed on the carrier, a drilling unit arranged on the boom, at least one control unit and at least one display device connected to the control unit, the drilling unit including at least one rock drilling machine and a tool;
    determining at least one current input parameter that is variable during operation of the rock drilling rig, the at least one current input parameter being selected from a current orientation of the rock drilling rig with respect to a predefined drilling plan and a position and direction of at least one hole planned to be drilled in the predefined drilling plan without moving the rock drilling rig;
    determining a working area according to the predefined drilling plan, that defines a reach of the tool of the drilling unit arranged on the boom and boundaries of the movement range of the tool, in the control unit on the basis of said current orientation of the rock drilling rig, according to said position and direction of at least one hole planned to be drilled and according to at least one fixed reach parameter;
    re-determining said working area and updating said graphical representation of said working area dynamically in response to a change in said orientation of the rock drilling rig or in said direction of at least one hole planned to be drilled; and
    displaying a graphical representation of said working area on the display by indicating one or more holes planned in the predefined drilling plan that can be drilled from a current position of the rock drilling rig without moving the rock drilling rig.

2. The method of claim 1, further comprising the step of determining the position of the rock drilling rig and using the position of the rock drilling rig as a further current input parameter for determining said working area.

3. The method of claim 1, further comprising the step of storing a kinematic model of the boom as the at least one fixed reach parameter, the kinematic model including information of at least the dimensions, joints and movement ranges of the joints of the boom that affects its reach, and using the kinematic model information as a basis for determining said working area.

4. The method of claim 1, further comprising the step of determining the movement range of at least one joint of the boom and using the movement range as the at least one fixed reach parameter for determining said working area defining the reach area of the drilling unit.

5. The method of claim 1, further comprising the step of determining the orientation of the tool and using the orientation of the tool as the current input parameter for determining said working area defining the reach of the drilling unit, wherein said graphical representation of said working area displays the position of the tool in relation to the working area.

6. An arrangement for a rock drilling rig, the arrangement comprising:
    means for determining at least one current input parameter that is variable during operation of the rock drilling rig, the at least one current input parameter being selected from a current orientation of the rock drilling rig with respect to a predefined drilling plan and a position and direction of at least one hole planned to be drilled without moving the rock drilling rig;

at least one control unit configured to determine a working area according to the predefined drilling plan and defining a reach of a tool of the drilling unit and boundaries of the movement range of the tool on the basis of said current orientation of the rock drilling rig, according to said position and direction of at least one hole planned to be drilled and according to at least one fixed reach parameter;

re-determining said working area and updating said graphical representation of said working area dynamically in response to a change in said orientation of the rock drilling rig or in said direction of at least one hole planned to be drilled; and at least one display configured to display said working area by indicating one or more holes planned in the predefined drilling plan that can be drilled from a current position of the rock drilling rig without moving the rock drilling rig.

7. The arrangement of claim 6, further comprising means for storing a kinematic model of a boom as the at least one fixed reach parameter of the drilling unit, the kinematic model including at least the dimensions, joints and movement ranges of the joints of the boom that affects its reach, and using the kinematic model information as a basis for determining said working area.

8. The arrangement of claim 6, wherein the drilling unit includes at least one rock drilling machine and a tool, wherein the arrangement further comprises means for determining the orientation of the tool and using the orientation of the tool as the at least one current input parameter for determining said working area; and wherein the display is configured to display a graphical representation of said working area by displaying the position of the tool in relation to the working area.

9. The arrangement of claim 6, wherein the means for determining the orientation of the rock drilling rig includes at least one of the following: an inclination sensor, an angle sensor and/or a linear movement sensor.

10. The arrangement of claim 6, wherein at least one of the control unit and the display is located remotely from the rock drilling rig.

11. A user interface of a rock drilling rig comprising at least one display, wherein the display is configured to display a working area of a rock drilling rig as a graphical representation determined on the basis of a current orientation of the rock drilling rig with respect to a predefined drilling plan and a position and direction of at least one hole planned to be drilled in the predefined drilling plan without moving the rock drilling rig, wherein the working area is defined by the predefined drilling plan that defines a reach of a tool of a drilling unit of the drilling rig, said graphical representation of said working area indicating one or more holes planned to be drilled in the predefined drilling plan from a current position of the rock drilling rig without moving the rock drilling rig and thus the boundaries of the movement range of the tool, and wherein said graphical representation is updated dynamically in response to a change in at least one current input parameter that is variable during operation of the rock drilling rig, the at least one current input parameter being selected from said orientation of the rock drilling rig or said direction of at least one hole planned to be drilled.

* * * * *